3,090,246
CONTROL MECHANISM FOR INFINITELY VARIABLE CONE PULLEY TRANSMISSIONS

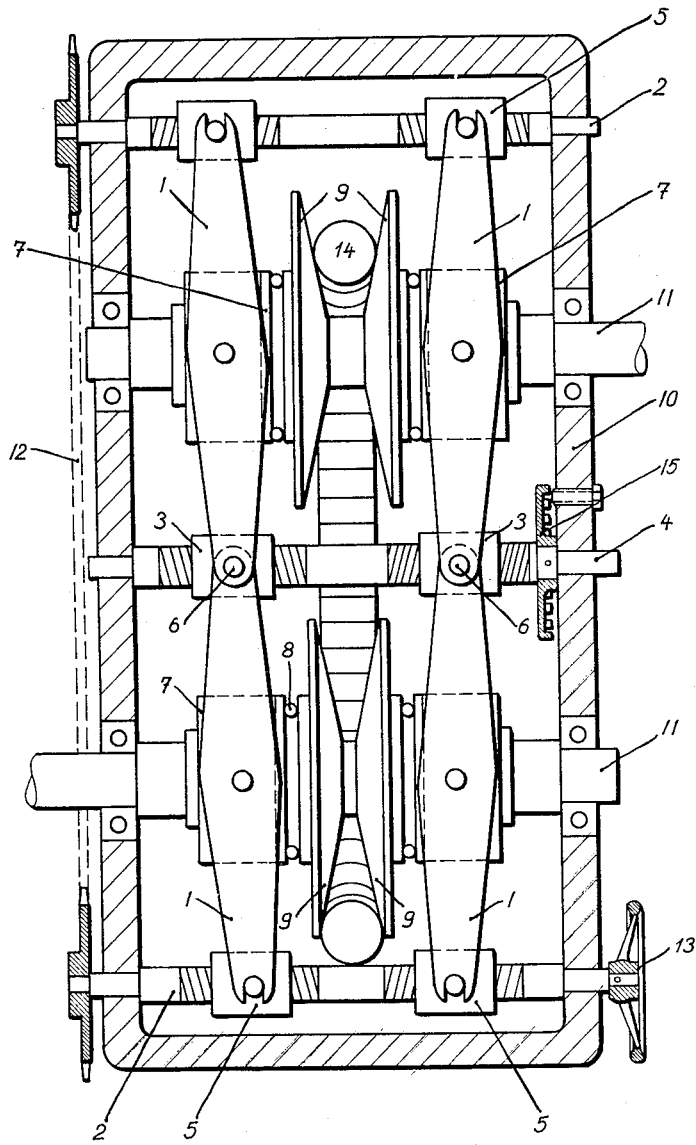

Heinrich Berens, Bad Homburg vor der Hohe, Germany, assignor to Reimers-Getriebe KG., Ascona, Switzerland, a firm of Switzerland
Filed June 26, 1961, Ser. No. 119,404
Claims priority, application Germany July 22, 1960
3 Claims. (Cl. 74—230.17)

The present invention relates to a control mechanism for an infinitely variable cone pulley transmission, the pulleys of which are connected by a link chain and in which each pulley consists of a pair of axially adjustable conical disks.

In prior control mechanisms of this type, the axial support and adjustment of the cone pulley disks in produced by means of a system of levers which is disposed symmetrically to the plane of travel of the chain and is adjustable by an adjusting spindle. The levers of these known mechanisms for effecting the adjustment of the pulley disks are provided in the form of two-armed levers which are pivotable on a tension control spindle which is mounted between the shafts of the two pairs of pulley disks. The arms of these levers are of different lengths since at one side of the transmission the frame formed by the levers and the adjusting spindle surrounds one pair of pulley disks, while at the other side of the transmission the lever arms only extend to the center of the other pair of pulley disks. The lever system is therefore unsymmetrical relative to the tension control spindle.

A change in the direction of the load acting upon the transmission also results in a similar change of the load acting upon the adjusting spindle. This characteristic is due to the law of pulley transmissions that the spreading forces acting upon the two pairs of cone pulley disks at the driving side and the driven side of the gear are of different sizes. This results in a change in load in the adjusting spindle insofar as, when the load is applied upon the pair of pulley disks next to the adjusting spindle, a traction is applied upon this spindle, while, when the load is applied upon the opposite pair of pulley disks, a thrust is applied upon the spindle. This change in the direction of the load occurs especially frequently in crosscutters as used in the manufacture of paper or the like. A play between the screw threads of the adjusting spindle and the adjusting blocks thereon and also between the slide rings and the adjusting levers then results in a change in the preset speed ratio.

A further disadvantage of the lever system which has previously been used consists in the fact that the lever arms of this system have unequal degrees of rigidity and are therefore bent at different amounts. If there is a change in the direction of the load, this also results in an additional change in the speed ratio.

Finally, an undesired change in the speed ratio is also produced when the tension control spindle is being turned to tighten the chain, since the adjusting levers will then pivot about their pivot points on the adjusting spindle and the pressure exerting points near the adjusting spindle will then shift for a smaller distance than those which are more remote from the adjusting spindle.

It is an object of the present invention to provide a control mechanism for an infinitely variable cone pulley transmission of the type as described which overcomes all of the above-mentioned disadvantages of the former control mechanisms by designing the adjusting means so as to be disposed symmetrically to the plane of travel of the chain and also to the tension control spindle which is mounted centrally between the two pairs of cone pulley disks, which means that this mechanism is provided with two adjusting spindles. These adjusting spindles are connected to each other, for example, by a common chain drive, in such a manner that both adjusting levers will always carry out the same movements, although in opposite directions to each other.

According to a further feature of the invention, this is attained by connecting the two adjusting spindles, for example, by a common chain drive, so as to be rotatable in the same direction and by providing them with screw threads which have the same pitch but extend in opposite directions to each other, or by connecting the two spindles by other means so as to have no play relative to each other.

The lever arrangement according to the invention which is disposed symmetrically to the center of the transmission results in identical kinematic conditions at both sides of the transmission, whereby the above-mentioned disadvantages will be overcome. Even though the transmission might be subjected to frequent reversals in load, there will be no play in the transmission since the stresses applied upon the adjusting spindles will only extend in the direction of the traction thereon. Since there are no longer any free bearing arms, it is also possible to reduce the bending of the adjusting levers to an insignificant value. Furthermore, it is now possible to tighten the chain without any danger that the speed ratio of the transmission will thereby be affected.

The objects, features, and advantages of the present invention will become more clearly apparent from the following detailed description of one preferred embodiment thereof as illustrated in a plan view in the accompanying drawing.

As shown in the drawing, the control mechanism according to the invention consists primarily of two pairs of adjusting levers 1 and two adjusting spindles 2. Levers 1 are pivotably mounted at their inner ends on threaded blocks 3 which are adjustable on a tension control spindle 4 and they are pivotably connected at their outer ends to threaded blocks 5 on the adjusting spindles 2.

By means of pressure-exerting members 7 which act upon ball bearings 8 and are pivotably connected to the adjusting levers 1, the latter act upon the two conical disks 9 of each pulley and press the same toward each other. Disks 9 are slidably mounted on shafts 11 which are rotatably mounted in the conventional manner within a frame 10. The adjusting spindles 2 which are provided with screw threads extending in opposite directions are connected to each other by a common chain drive 12 or the like so as to be rotatable in the same direction. In order to apply equal adjusting forces at both sides of the transmission, tension spindle 4 is preferably mounted centrally between the two pairs of pulley disks 9.

The manner of operation of the adjusting mechanism according to the invention is as follows:

If the speed ratio of the transmission should be changed, it is merely necessary to turn one of the adjusting spindles 2 by a handwheel 13 or the like, whereby the threaded blocks 5 on this spindle 2 are moved, for example, inwardly toward each other, so that a pressure is exerted upon the respective adjusting levers 1 which is transmitted to the pressure members 7 which are pivotably connected thereto and which are thus pressed against the conical disks 9. At the same time, the adjusting spindle 2 at the other side of the transmission is turned by the chain drive 12 for a corresponding amount, whereby the adjusting levers 1 and the conical disks 9 of that side are moved outwardly for the same distance which those on the first side of the transmission are moved inwardly. Chain 14 which connects the two pairs of pulley disks will therefore move inwardly between one pair of disks for the same distance which it moves outwardly between the other pair. The speed ratio is therefore changed without affecting the chain tension. Any adjustment of spindles 2 results in a pivotal movement of all adjusting levers 1 for an equal distance which, in turn, results in an axial movement of all conical disks 9 for an equal distance. If the chain must be tightened, the tension control spindle 4 is turned by means of a crown gear 15. The pivot points 6 of the adjusting levers 1 are then moved inwardly, whereby the pressure members 7 through ball bearings 8 press all of the conical disks 9 equally inwardly and thereby press the chain at both sides to an equal extent outwardly.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A control mechanism for an infinitely variable cone pulley transmission having two pairs of axially movable cone pulley discs and a flexible member connecting the same, comprising four lever members arranged in pairs and adapted to act upon said pulley discs, said lever members being disposed symmetrically, with respect to a first plane perpendicular to the axes of rotation of the pulley discs and also symmetrically with respect to a second plane parallel to said axes and perpendicular to said first plane and located midway between said axes, means mounting said lever members so as to be independently pivotable at their inner ends about axes disposed within said second plane, and means operatively connected with the outer ends of the said lever members for simultaneously adjusting said lever members by equal amounts of pivotal movement, the lever members of each pair of lever members on the same side of said first plane being pivoted in opposite directions by said adjusting means.

2. A control mechanism for an infinitely variable cone pulley transmission having two pairs of axially movable cone pulley disks and a flexible member connecting the same, comprising four lever members arranged in pairs and adapted to act upon said pulley disks, said lever members being disposed symmetrically with respect to a first plane perpendicular to the axes of rotation of the pulley disks and also symmetrically with respect to a second plane parallel to said axes and perpendicular to said first plane and located midway between said axes, means mounting said levers so as to be independently pivotable at their inner ends about axes disposed within said second plane, a pair of spindles for adjusting said lever members extending parallel to the axes of said pulley disks and each having oppositely directed screw threads, nutlike members on said spindles pivotably connected to the outer ends of said lever members, and a chain drive connecting said adjusting spindles to each other for rotating said spindles in the same direction so that the outer ends of all of said lever members will carry out movement of an equal size and without play and the outer ends of the lever members of each pair will move simultaneously in opposite directions.

3. A control mechanism for an infinitely variable cone pulley transmission having two pairs of axially movable cone pulley disks and a flexible member connecting the same, comprising four lever members arranged in pairs and adapted to act upon said pulley disks, said lever members being disposed symmetrically, with respect to a first plane perpendicular to the axes of rotation of the pulley disks and also symmetrically with respect to a second plane parallel to said axes and perpendicular to said first plane and located midway between said axes, a tension control spindle extending within said central plane and having oppositely directed screw threads, a pair of first nutlike members on said tension control spindle, means pivotably connecting the inner ends of said lever members to said first nutlike members, a pair of spindles for adjusting said lever members extending parallel to the axes of said pulley disks and each having oppositely directed screw threads, second nutlike members on said spindles and pivotably connected to the outer ends of said lever members, and a drive connecting said adjusting spindles to each other for rotating said spindles in the same direction so that the outer ends of all of said lever members will carry out movement of equal size without play and the outer ends of the lever members of each pair will move simultaneously in opposite directions.

References Cited in the file of this patent

UNITED STATES PATENTS

| 818,450 | Hunter | Apr. 24, 1906 |
| 2,183,267 | Rieser | Dec. 12, 1939 |
| 2,791,125 | Rowlands | May 7, 1957 |

FOREIGN PATENTS

| 252,417 | Switzerland | Oct. 1, 1948 |
| 802,780 | Germany | Feb. 26, 1952 |